US007184966B1

(12) United States Patent
Parsonnet et al.

(10) Patent No.: US 7,184,966 B1
(45) Date of Patent: Feb. 27, 2007

(54) SYSTEMS AND METHODS FOR REMOTE ROLE-BASED COLLABORATIVE WORK ENVIRONMENT

(75) Inventors: Brian Parsonnet, Fort Collins, CO (US); Lane D. Desborough, Thousand Oaks, CA (US); Tariq Samad, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/474,948

(22) Filed: Dec. 30, 1999

(51) Int. Cl.
*G06F 9/46* (2006.01)
(52) U.S. Cl. ............................. 705/8; 705/7
(58) Field of Classification Search ................ 705/7–8, 705/1, 36–38, 26; 700/100, 102; 709/206
See application file for complete search history.

(56) References Cited

U.S. PATENT DOCUMENTS

| | | | | |
|---|---|---|---|---|
| 5,581,691 | A * | 12/1996 | Hsu et al. ...................... | 714/15 |
| 5,842,178 | A * | 11/1998 | Giovannoli .................... | 705/26 |
| 5,920,846 | A * | 7/1999 | Storch et al. .................. | 705/7 |
| 5,960,404 | A | 9/1999 | Chaar et al. | |
| 5,987,422 | A * | 11/1999 | Buzsaki ......................... | 705/9 |
| 6,012,066 | A * | 1/2000 | Discount et al. ......... | 707/103 R |
| 6,067,525 | A * | 5/2000 | Johnson et al. ............... | 705/10 |
| 6,073,109 | A * | 6/2000 | Flores et al. .................. | 705/8 |
| 6,260,024 | B1* | 7/2001 | Shkedy ......................... | 705/37 |
| 6,349,238 | B1* | 2/2002 | Gabbita et al. ............. | 700/100 |
| 6,502,087 | B1* | 12/2002 | Tsuiki et al. .................. | 707/1 |

FOREIGN PATENT DOCUMENTS

| | | |
|---|---|---|
| EP | 0 967 545 A1 | 12/1999 |
| WO | WO 98/13757 A1 | 4/1998 |

OTHER PUBLICATIONS

Dialog "IBM'S MQSeries Workflow Automates Business Process to Help Companies Compete in E-Business", Jul. 1998; Business Wire, Dialog file 16, Accession No. 907281292.*
Sarin et al "A Process Model and System for Supporting Collaborative Work"; 1991; Xerox Advanced Information Technology; ACM, pp. 213-224.*
Kungl Tekniska Högskolan. entitled *Extensions of a performance index and detection of static friction in process control loops*, by Alexander Horch, Chapter 6, pp. 57-84.
Cingil et al, "An Adaptable Workflow System Architecture on the Internet for Electronic Commerce Applications", Distributed Objects and Applications, 1999. Proceedings of the International Symposium on Edinburgh, UK Sep. 5-6, 1999.
PCT, International Search Report, European Patent Office, Jan. 16, 2002.

* cited by examiner

*Primary Examiner*—Romain Jeanty
(74) *Attorney, Agent, or Firm*—Munck Butrus, P.C.

(57) ABSTRACT

A network between customers generating service requests and vendors capable of electronically fulfilling the service requests includes a system for monitoring, controlling, and administering work flows associated with the service requests. A main controller creates and controls a first work flow record associated with a first service request for storage in a storage device. The main controller also receives work flow elements including messages, data files, software applications, and documents from a first customer and a first vendor associated with the first work flow, stores the work flow elements in the storage device, and transfers the work flow elements to the first customer and the first vendor. An accounting controller associated with the main controller identifies fees associated with the first work flow and stores fee data associated with the fees in the first work flow record.

27 Claims, 6 Drawing Sheets

SYSTEMS AND METHODS FOR REMOTE ROLE-BASED COLLABORATIVE WORK ENVIRONMENT

TECHNICAL FIELD OF THE INVENTION

The present invention relates generally to systems and methods for initiating, controlling, securing, tracking, and accounting a work flow in a dispersed, collaborative work environment.

BACKGROUND OF THE INVENTION

Communication networks, including the Internet and privately owned intranets, are being used in increasingly diverse ways to provide people with goods and services as efficiently and cheaply as possible. Consumers and businesses already can purchase a wide variety of goods over the Internet. More recently, service providers have begun to sell their services, including professional services, over the Internet. These "remote services" include engineering services, medical services, legal services, accounting services, and the like, that may be provided by one or more vendors to a customer in a collaborative work environment, where the service can be delivered electronically (e.g., electronic reports, software models, software programs, data base records, and the like).

While communication networks may make it easier for a customer to search for and identify vendors with whom the customer may wish to do business, many of the traditional problems associated with purchasing, performing, delivering and accounting for services from vendors remain unchanged. A customer (whether a consumer or a business) still must review the credentials and the prices of a group of vendor candidates in order to select one or more vendors that will actually perform the job (or selected portions of the job). Additionally, remote services often require access to proprietary networks for integration and for data access. Unfortunately, this often creates costly and sometime intractable information technology (IT) security problems for both the vendor and the customer.

Furthermore, charging for remote services is a non-integrated task that must be separately managed. Internet-based remote services require the vendor and the customer to have knowledge regarding what entities are involved in a collaboration (such as e-mail addresses, individual names, and the like) and regarding what aspect(s) of the service are being provided (charge tracking, asking questions, reviewing materials, transferring data, and the like).

There are some commercially available products that allow individuals and business entities to work in a somewhat collaborative environment. For example, CITRIX SYSTEMS, INC. provides WINFRAME® application server software, which allows for remote access to, and remote operation of, computer programs. However, the WINFRAME® application server software assumes that the remote service provider is a "trusted" party and does not address security, accounting, or specific collaboration tasks. Microsoft Corporation provides NETMEETING™ software, which allows real-time conferencing over the Internet by two or more persons. However, NETMEETING™ ignores the accounting and billing aspects of a collaborative work environment, requires all parties to be operating simultaneously, and does not have specialized features to allow automated parties, such as computer-executed applications, to participate in the collaborative environment.

In sum, conventional collaborative work applications that are implemented over a common communication network frequently provide little more to customers and vendors than an on-line document repository, remote manipulation of data and applications, and basic e-mail services. A customer seeking a service still must perform a large amount of "overhead" work that is not related to the main job, such as searching for and evaluating vendors, tracking work flow, accounting for charges, coordinating between multiple vendors, and the like.

There is therefore a need in the art for systems and methods that allow customers and vendors (i.e., services providers) to work more efficiently in an on-line collaborative environment. In particular, there is a need in the art for systems and methods that allow a person or business entity (i.e., a customer) that requires a service to obtain that service quickly and cheaply from one or more qualified service providers without requiring the person or business entity to search for and evaluate vendors personally. More particularly, there is a need for a collaborative work environment application that can automatically track and provide accounting for services provided by one or more service providers associated with a customer-defined work project. There is a still further need for a collaborative work environment application that allows a customer to access automated services from one or more computer-executed applications. A further need exists for a collaborative work environment application that allows different steps in a work flow to be performed by one or more parties.

SUMMARY OF THE INVENTION

To address the above-discussed deficiencies of the prior art, the present invention provides, for use in connection with a network capable of providing communications between a plurality of customers generating service requests and a plurality of vendors capable of fulfilling the service requests, a system for monitoring and controlling work flows associated with the service requests between the plurality of customers and the plurality of vendors. In an advantageous embodiment of the present invention, the system comprises: 1) a main controller capable of creating a first work flow record used to control a first work flow associated with a first service request and storing the first work flow record in a storage device associated with the main controller, wherein the main controller is further capable of receiving from a first customer and a first vendor associated with the first work flow at least one of messages, data files, software applications, and documents, storing the at least one of messages, data files, software applications, and documents in the storage device, and transferring at least one of the at least one of messages, data files, software applications, and documents to at least one of the first customer and the first vendor; and 2) an accounting controller associated with the main controller capable of identifying at least one fee associated with the first work flow and storing fee data associated with the at least one fee in the first work flow record.

According to one embodiment of the present invention, the first work flow record comprises a plurality of work flow definitions defining at least one process step to be performed by at least one of the main controller, the accounting controller, a first customer processing device associated with the first customer, and a first vendor processing device associated with the first vendor.

According to another embodiment of the present invention, the at least one of the plurality of work flow definitions is modifiable by the first customer.

According to still another embodiment of the present invention, the at least one of the plurality of work flow definitions is modifiable by the first vendor.

According to yet another embodiment of the present invention, the first work flow record comprises a primary work flow record associated with the first service request and a secondary work flow record associated with a second work flow associated with the first work flow.

According to a further embodiment of the present invention, the second work flow is associated with a second service request generated by the first vendor in response to the first service request generated by the first customer.

According to a still further embodiment of the present invention, the accounting controller is further capable of identifying at least one additional fee associated with the second work flow and storing second fee data associated with the at least one additional fee in the first work flow record.

According to a yet further embodiment of the present invention, the accounting controller stores fee data associated with the first work flow in the primary work flow record and stores fee data associated with the second work flow in the secondary work flow record.

According to another embodiment of the present invention, a first service associated with the first service request is performed by a customized computer-executable application generated by the first vendor, wherein the customized computer-executable application performs specific operations designed by the first vendor to meet unique requirements of the first customer.

According to a further embodiment of the present invention, the main controller is capable of transferring the customized computer-executable application from a first data processing device associated with the first vendor to at least one of a second data processing device associated with the main controller and a third data processing device associated with the customer, wherein the main controller transfers the customized computer-executable application to the at least one of the second data processing device and the third data processing device to cause the customized computer-executable application to execute.

The present invention also provides a system for brokering service requests between a plurality of customers and a plurality of vendors for use in connection with a communication network capable of providing communications between the plurality of customers generating service requests and the plurality of vendors capable of fulfilling the service requests. In an advantageous embodiment of the present invention, the system for brokering the service requests comprises a main controller capable of receiving a first service request from a first of the plurality of customers, generating a first record associated with the first service request, and storing the first record in a storage device associated with the main controller; wherein the main controller is further capable of determining a nature of a first requested service associated with the first service request, and in response to the nature of the first requested service, allowing at least one of the plurality of vendors to access the first record in the storage device.

In one embodiment of the present invention, the main controller transmits a notification associated with the first service request to the at least one vendor.

In another embodiment of the present invention, the at least one vendor comprises at least one vendor capable of performing the first requested service.

In still another embodiment of the present invention, the main controller selects the at least one vendor from a list of suitable vendors capable of performing the first requested service.

In yet another embodiment of the present invention, the main controller is further capable of determining if the at least one vendor has accepted the first service request, and in response to the determination, transmitting an acceptance notification to the first customer. The acceptance notification optionally may include a status notice, including, for example, completion of the requested service, expected charge(s), order status, and the like.

In a further embodiment of the present invention, the first service request comprises customer price information indicating an amount the first customer is willing to pay for performance of the first requested service.

In a still further embodiment of the present invention, the main controller stores in the storage device documents associated with the first service request. Optionally, the vendor may send to the buyer some mechanism for collecting required data, such as a form, a program which automatically gather information, and the like.

In a yet further embodiment of the present invention, the main controller stores in the storage device customer associated with the first service request.

In another embodiment of the present invention, the main controller is further capable of transferring messages between the first customer and the at least one vendor.

In still another embodiment of the present invention, the system further comprises an accounting controller associated with the main controller, wherein the accounting controller is capable of tracking at least one of invoice data and payment data transmitted between the first customer and the at least one vendor.

It is noted that services that are remotely accessed and executed may add overhead to a network, at least when compared to services that are accessed and executed locally in the network, even it the service is fully automated. In an advantageous embodiment of the present invention, portions of a work flow that are executed by a software application customized by a service provider to the needs of a specific customer may be migrated in whole or in part to the most efficient location for execution. This allows the remote service provider to only be directly involved in the work flow when the situation demands the service provider's expertise and participation. This increases performance, decreases costs, and reduces the involvement of the remote expert down to his or her core competency.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, coupled to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed data network.

Figure 1:
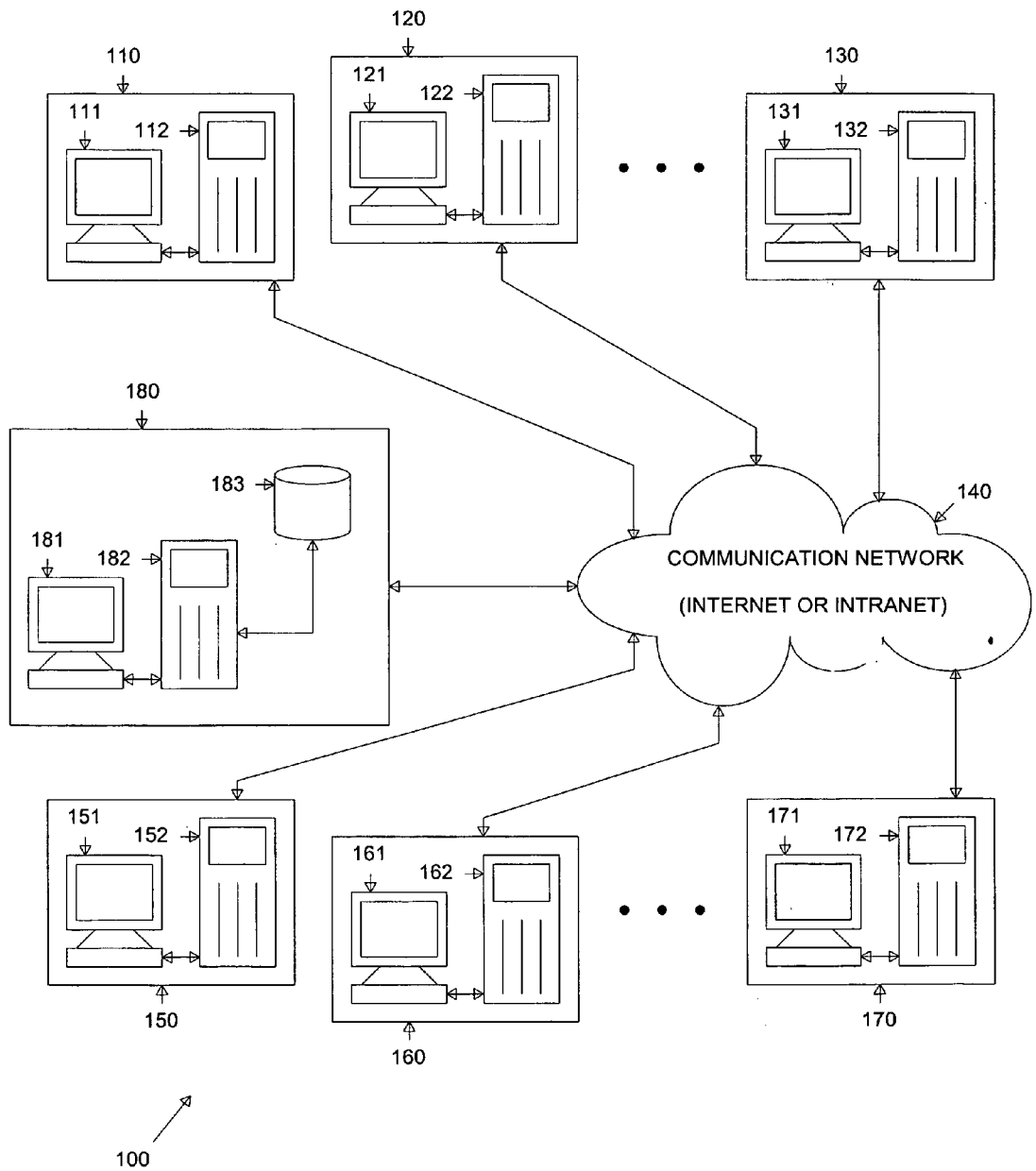
FIG. 1 is a block diagram of a remote collaborative environment system according to one embodiment of the present invention.

FIG. 1 is a block diagram of remote collaborative environment system 100. Remote collaborative environment system 100 comprises a group of "M" customer networks, including exemplary customer networks 110, 120, and 130, and a group of "N" vendor networks, including exemplary vendor networks 150, 160, and 170. The customer networks and vendors networks communicate over common communication network 140, which may be, for example, the Internet or one or more privately owned intranets. Remote collaborative environment system 100 also comprises a remote collaborative environment (RCE) network 180.

Exemplary customer network 110 may comprise one or more workstations, collectively represented by workstation 111, and one or more customer servers, collectively represented by customer server 112. Similarly, exemplary customer network 120 may comprise one or more workstations, collectively represented by workstation 121, and one or more customer servers, collectively represented by customer server 122. Finally, exemplary customer network 130 may comprise one or more workstations, collectively represented by workstation 131, and one or more customer servers, collectively represented by customer server 132. Each of customer networks 110, 120 and 130 allows one or more users to access RCE network 180 in order to request a service from at least one vendor who can provide the requested service.

It should be understood that the above-described embodiments of customer networks 110, 120, and 130 are illustrative only and that other architectures may be employed that do not depart from the spirit and scope of the invention. For example, in alternate embodiments of the present invention, one or more of customer networks 110, 120, and 130 may comprise a single desktop personal computer (PC) coupled to the Internet that provides a single user with access to RCE network 180.

Exemplary vendor network 150 may comprise one or more workstations, collectively represented by workstation 151, and one or more vendor servers, collectively represented by vendor server 152. Similarly, exemplary vendor network 160 may comprise one or more workstations, collectively represented by workstation 161, and one or more vendor servers, collectively represented by vendor server 162. Finally, exemplary vendor network 170 may comprise one or more workstations, collectively represented by workstation 171, and one or more vendor servers, collectively represented by vendor server 172. Each of vendor networks 150, 160 and 170 allows one or more users to access RCE network 180 in order to perform a service requested by a customer.

The terms "customer" and "vendor" as used herein are to be construed broadly. In general, a "customer" (or "requester") is any person, business entity, or software application that requests that a particular service be performed. Furthermore, a "vendor" (or "provider") is any person, business entity or software application that performs (provides) the requested service.

Finally, remote collaborative environment (RCE) network 180 comprises one or more workstations, collectively represented by workstation 181, one or more servers, collectively represented by remote collaborative environment (RCE) server 182, and one or more database storage devices, collectively represented by database storage device 183. Among other things, RCE server 182 acts as a broker between a customer requesting a service and a vendor that wishes to provide the requested service.

In an advantageous embodiment of the present invention, RCE network 180 provides a remote, role-based, asynchronous collaborative service environment for initiating and controlling work flow between the customer and one or more vendors. By "remote," it is meant that the vendor(s) (or provider(s), more generally) and the customer(s) (or requester(s), more generally) can be geographically dispersed over an arbitrary area. "Role-based" means that the collaboration participants (i.e., customer and vendor(s)) may be identified and selected by the "request for service" (or vendor role) rather than by a unique identification (ID), which typically is a person's name or a computer's address). Role-based identification and selection allows the vendor identification to both be hidden and virtual, which in turn allows the role to be filled by any entity capable of providing the service (including a human expert, a computer executing a software application, or by a combination of a human expert and a computer). The separation of the request for services (collaboration) from the specific supplier of the services, following a component-based architecture, both simplifies the request of such services, and allows for competition and seamless migration regarding the system by which those services are provided. It also enables the provider or the services to be brokered without (or with) knowledge as to where the services are being rendered.

By way of example, a user of customer network 110 may wish to have a spread sheet prepared from raw financial data that the user has in his or her possession. The user of customer network 110 may not necessarily care who prepares the spread sheet, so long as the service provider is of adequate competency. In accordance with the principles of the present invention, the spread sheet may be prepared by a human operator of, for example, vendor network 150 or may be prepared by a software application that is executed on vendor network 150. The spread sheet also may be prepared as a result of additional collaborations with other human operators or software applications on vendor network 160, vendor network 170, or elsewhere.

In fact, neither the service provider (vendor) nor the service requester (customer) needs to know anything about, or communicate with, the other party. Instead, RCE server 182 acts as a broker of the requested service.

The term "asynchronous" means that the collaboration may occur as a sequence of participation. All parties need not be working together at the same time. This is important, for example, if two parties are located on different continents, if work schedules don't allow simultaneous access, or if the specific solution requires a number of activities to be executed in series. The term "collaborative" means that multiple parties (human, computer or both) are jointly contributing to a solution.

Finally, the term "services" is broadly defined to mean any activity or operation contributing to a solution. Human services are often (but not always) measured in time. Computer or automated services may be measured by the dimensions of a problem, the amount of resources consumed to solve the problem, or any other metric. In some instances, services may be provided free, as when the customer and the service provider work for the same company. However, in an advantageous embodiment, RCE server 182 provides a tracking and accounting capability that resolves billing matters and tracks and records the costs of a service.

Again, by way of example, suppose a manufacturing company in Texas operating customer network 110 wants to have a compressor problem analyzed. A compressor expert in London, England operating vendor network 150 wishes to deliver his services (i.e., his expertise) by remotely assessing computer performance for facilities around the world. An application executed on RCE server 182 and customer network 110 interrogates an operator at the manufacturing company for required compressor data and customer identification data. This could be done by means of a custom application, a web page, or any computer-based user interface. Additional input data may be collected automatically by the application.

The application, with or without the manufacturing company's awareness, may send the available data and problem description to RCE server 182 as a request for specific help (but not necessarily for a specific provider of such help). RCE server 182, through prior knowledge (configuration) or other mechanism (e.g., search), may then send the data and problem description to the expert in England, with the request for service. After reviewing the data and problem description, the compressor expert may wish to ask questions regarding the problem. The expert may then prepare a list of questions and materials and re-submit them to RCE server 182 with the target "role" in this case being the manufacturer of the compressor. Thereafter, materials, data, annotations, and instructions may continue to be transferred between the parties until the expert resubmits his recommendations back to the original service requester (i.e., the manufacturing company). This final transfer (and possible intermediate transfers) invoke a charge for the delivered services. All transfers in this example occur across communication network 140.

Figure 2:
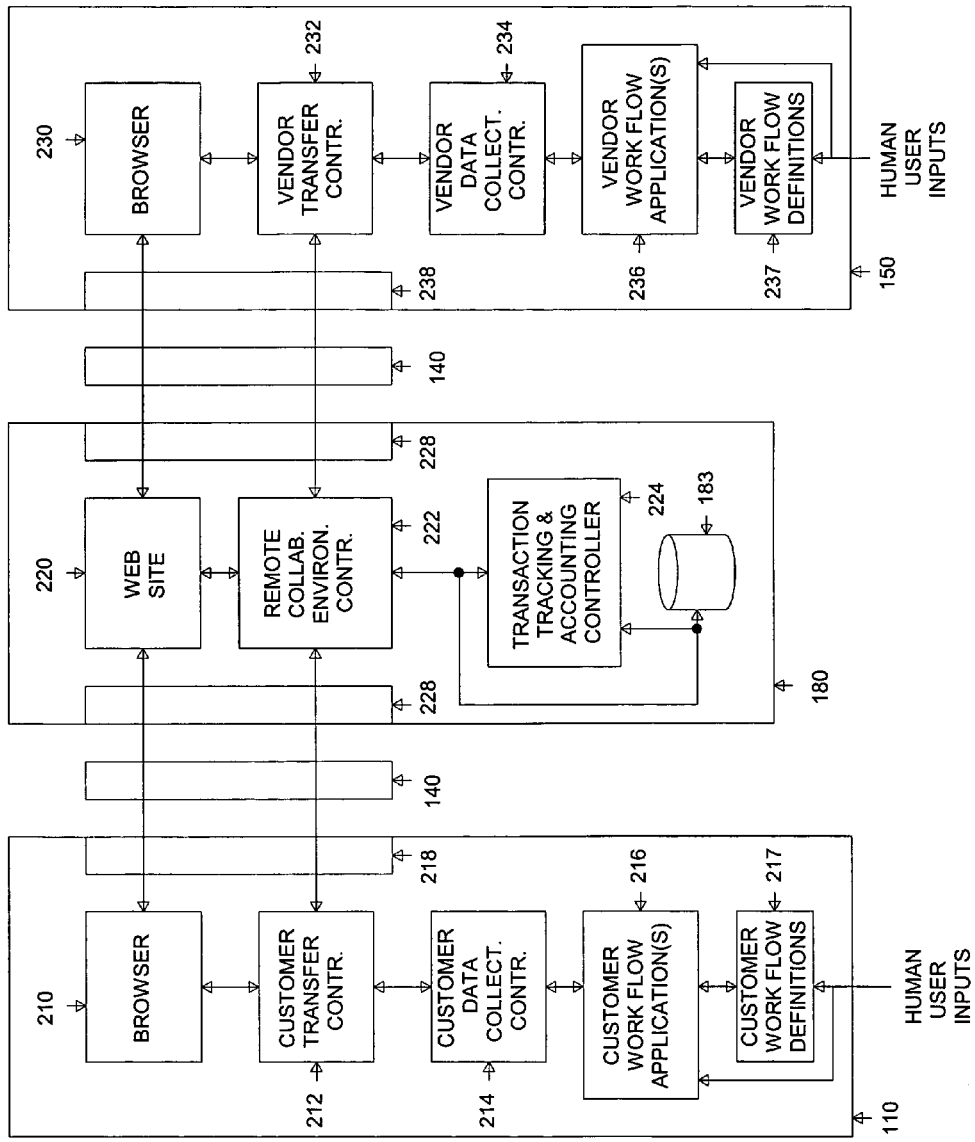
FIG. 2 is a more detailed block diagram of selected portions of remote collaborative environment system according to one embodiment of the present invention.

FIG. 2 is a more detailed block diagram of selected portions of remote collaborative environment system 100. In particular, FIG. 2 illustrates selected portions of customer network 110, vendor network 150, RCE network 180 and communication network 140. Customer network 110 comprises browser software application 210 (hereafter, simply "browser 210"), customer transfer controller 212, customer data collection controller 214, customer work flow application(s) 216, customer work flow definitions file 217 and security application 218, which may include, for example, a hardware security apparatus or firewall software. Vendor network 150 comprises browser software application 230 (hereafter, simply "browser 230"), vendor transfer controller 232, vendor data collection controller 234, vendor work flow application(s) 236, vendor work flow definitions file 237 and security application 238, which also may include, for example, a hardware security apparatus or firewall software. Finally, RCE network 180 comprises web site software application 220 (hereafter, simply "web site 220"), remote collaborative environment (RCE) controller 222, transaction tracking and accounting controller 224, database storage device 183, and security application 228, which may include, for example, a hardware security apparatus or firewall software.

The term "controller" as used with respect to the items in FIG. 2 is broadly defined and may mean any device, system or part thereof that controls at least one operation. Such a device may be implemented in hardware, firmware, or software, or some combination of at least two of the same. Furthermore, the functionality associated with any particular controller may be centralized or distributed, whether locally or remotely. A controller may comprise one or more data processors, and associated input/output devices and memory, that execute one or more application programs and/or an operating system program.

In particular, customer transfer controller 212 and customer data collection controller 214 may comprise software applications executed by the central processing unit (CPU) in customer server 112. Customer server 112 may also execute browser 210, security application 218, and one or more of customer work flow applications 216. Likewise, vendor transfer controller 232 and vendor data collection controller 234 may comprise software applications executed by the central processing unit (CPU) in vendor server 152. Vendor server 152 may also execute browser 230, security application 238, and one or more of vendor work flow applications 236. Finally, remote collaborative environment (RCE) controller 222 and transaction tracking and accounting controller 224 may comprise software applications executed by the central processing unit (CPU) in RCE server 182. RCE server 182 may also execute web site 220 and security application 228.

A customer (or service requester) initially creates a work flow in RCE network 180 by accessing web site 220 through browser 210 and providing RCE server 182 with details regarding the job requirements and price information associated with the work flow, as described below in FIG. 4. The term "work flow" is defined broadly to mean any service requested by a person (or business) operating a customer network, such as customer network 110 that is to be performed by a vendor operating a vendor network, such as exemplary vendor network 150.

For instance, if customer network 110 is operated by an manufacturing company that operates a power plant containing a heat exchanger, the work flow may comprise a request that a vendor analyze physical measurements taken over a period of time in the heat exchanger and prepare a report evaluating the efficiency of the heat exchanger and identifying any suspected problem. The initial work flow optionally may identify price information regarding the requested service, such as a maximum price, an hourly rate price, a price range, and the like.

Taking this example further, if the manufacturing company frequently requests services from different vendors for different work flows and receives invoices from all of the vendors through transaction tracking and accounting controller 224, the manufacturing company may decide to request financial services from vendors that are accountants. In particular, the manufacturing company may create another work flow in RCE network 180 that requests that a vendor prepare spread sheets and perform other financial analysis based on all of the invoices received from vendors over a period of time. Accounting vendors may then respond to the new service request and perform the job requested in the work flow.

In other embodiments, the work flow may pertain to medical services. For example, the medical staff at a hospital may gather medical statistics on a patient suffering from an ailment that may be unknown or only suspected. The hospital, acting as customer, may create a work flow in RCE server 180 comprising the patient's medical information, a request for a specialist to analyze the same and prepare a diagnosis, and (optionally) pricing information. RCE server 180 may then allow one or more pre-qualified specialists, acting as vendors, to access the work flow and accept or decline the service request.

Additionally, it should be noted that the use of browser 210 to interface with the operator of customer network 110 is merely illustrative and should not be construed to limit the scope of the present invention. Those skilled in the art will readily understand that other types of user interfaces may readily be implemented in association with RCE network 180 in order to gather customer data and vendor data and to create and control work flows.

In addition to interacting with browser 210, the operator of customer network 110 may interact with one or more customer work flow applications 216 that generate the documents and data files that are used in a work flow. For example, customer work flow applications 216 may include word processing applications, spread sheet applications, engineering software, such as CAD/CAM applications, equipment monitoring software, such as a telemetry application, and the like. When the operator of customer network 110 first initiates a work flow in RCE network 180, customer data collection controller 214, which may work in cooperation with browser 210, gathers initial setup data from the operator, such as a business name or a personal name, address information, description of the service requested, customer job requirements (e.g., deadlines, document formats, and the like), price information, and the like. If the operator of customer network 110 has previously used RCE network 180, a user name and password prompt may be used to quickly identify the operator and retrieve previously stored information.

Customer work flow definitions file 217 comprises data generated by the operator of customer network 110 that defines selected portions of the customer side of the work flow. For example, customer work flow definitions file 217 may comprise a template of work flow steps that are to be performed in customer network 110, or in RCE network 180, or both, as part of the overall work flow. For example, the work flow steps may specify that after a requested service, such as a heat exchanger analysis, is performed, one or more additional steps or subsidiary work flows are to be executed, such as an accounting service request or a word processing request. Thus, a work flow may actually comprise a primary service request and a group of subsidiary work flows containing related secondary service requests. The contents of customer work flow definitions file 217 may be created by the operator of customer network 110 in response to prompt messages generated by browser 210.

Customer transfer controller 212 is a data transfer agent that receives from customer data collection controller 214 all of the information input by the operator of customer network 110, including the contents of customer work flow definitions file 217, and transmits it through communication network 140 to remote collaborative environment controller 222 in RCE network 180. Customer transfer controller 212 may communicate across communication network 140 according to any conventional protocol, including Internet protocol (IP), HTTP, VRML, BIZTALK or other XML protocol. Customer transfer controller 212 may transfers messages, documents and data between customer network 110 and RCE network 180 in response to customer commands or it may periodically poll customer network 110 and RCE network 180 to determine if there are messages, documents or data to be transferred.

After a work flow is initially created, customer transfer controller 212 and customer data collection controller 214 continue to interact with the operator of customer network 110 during subsequent sessions with RCE network 180. For example, a vendor may respond to a service request in a work flow by asking one or more questions or requesting additional documents from customer network 110. In this case, customer transfer controller 212 and customer data collection controller 214 continue to operate as before, gathering information from the operator of customer network 110 and transmitting it to RCE network 180.

A vendor (or service provider) operating vendor network 150 responds to a work flow in RCE network 180 by accessing web site 220 through browser 230 and requesting from RCE server 182 the details regarding the job requirements and price information associated with the work flow.

After reviewing the service request and price information contained in a work flow, the potential vendor may decline to provide the service.

Alternatively, the vendor may decide to accept the work flow or may decide to ask for additional information and/or documents from the customer that generated the work flow. To do this, the operator of vendor network 150 may interact with one or more vendor work flow applications 236 that generate any documents and data files need to respond to the service requested in the work flow. For example, vendor work flow applications 236 may include word processing applications, spread sheet applications, engineering software, such as CAD/CAM applications, equipment monitoring software, such as a telemetry application, and the like. Advantageously, vendor work flow applications 236 may comprise unique and customized applications developed by the vendor operating vendor network 150. For example, the vendor operating vendor network 150 may be an engineering specialist with an expertise in analyzing a particular type of heat exchanger, turbine, refinery equipment, or the like. The customized vendor work flow applications 236 may execute unique algorithms developed by the vendor to perform the required analysis on the particular equipment. Advantageously, the vendor may, for a price, allow a customized vendor work flow application 236 to be exported to RCE network 180, customer network 110, or both. Thus, a customer may obtain services from a human, from an application program, or both via RCE network 180.

It should be noted that in those embodiments of the present invention where a service is provided by customized vendor work flow application 236 and/or where customer inputs and responses are generated automatically in customer network 110, such as by customer work flow applications 216, all data exchanges may be handled automatically (i.e., without human intervention) by one or more of customer transfer controller 212, remote collaborative environment controller 222, and vendor transfer controller 232. In essence, this means that browser 210, web site 220 and browser 230 may not be used in order to create and/or accept a work flow, to perform a requested service or to transfer messages, electronic documents, and electronic data files between customer network 110, vendor network 150 and/or RCE network 180.

When the vendor operating vendor network 150 first accesses a work flow in RCE network 180, vendor data collection controller 234, which may work in cooperation with browser 230, gathers initial setup data from the operator, such as business or personal name, address information, area of expertise, vendor price information, and the like, and also may receive questions and document requests from the vendor. If the operator of vendor network 150 has previously accessed RCE network 180, a user name and password prompt may be used to quickly identify the vendor and retrieve previously stored information.

Vendor work flow definitions file 237 comprises data generated by the operator of vendor network 150 that defines selected portions of the vendor side of the work flow. For example, vendor work flow definitions file 237 may comprise a template of work flow steps that are to be performed in vendor network 150, or in RCE network 180, or both, as part of the overall work flow. For example, the work flow steps in vendor work flow definitions file 237 may specify that after a service request is received, one or more additional steps or subsidiary work flows are to be executed, such as sending notifications to the supervisor of the person that performs the requested service or generating an accounting service request. As another example, the vendor work flow definitions file 237 may specify that after a vendor employee, a power plant expert, prepares a draft report analyzing the performance of a customer's generator, the draft report is to be forwarded to an editor within vendor network 150. The editor then edits the draft report and the final "approved" draft is forwarded to customer network 110. Vendor work flow definitions file 237 may further specify that separate accounting services are to be performed with respect to the power plant analysis services performed by the expert and the editing services performed by the editor. The contents of vendor work flow definitions file 237 may be created by the vendor in response to prompt messages generated by browser 230.

Vendor transfer controller 232 is a data transfer agent that receives from vendor data collection controller 234 all of the information input by the vendor operating vendor network 150 and transmits it through communication network 140 to remote collaborative environment controller 222 in RCE network 180. Vendor transfer controller 232 may communicate across communication network 140 according to any conventional protocol, including Internet protocol (IP). Vendor transfer controller 232 may transfers messages, documents and data between vendor network 150 and RCE network 180 in response to vendor commands or it may periodically poll vendor network 150 and RCE network 180 to determine if there are messages, documents or data to be transferred.

As in the case of customer network 110, it should be noted that the use of browser 230 to interface with the operator of vendor network 150 is merely illustrative and should not be construed to limit the scope of the present invention. Those skilled in the art will readily understand that other types of user interfaces may readily be implemented in association with RCE network 180 in order to gather customer data and vendor data and to create and control work flows.

After a work flow is accepted by the vendor, vendor transfer controller 232 and vendor data collection controller 234 continue to interact with the vendor during subsequent sessions with RCE network 180. For example, a vendor may from time to time ask questions or request additional documents from customer network 110. In this case, vendor transfer controller 232 and vendor data collection controller 234 continue to operate as before, gathering information from the vendor operating vendor network 150 and transmitting it to RCE network 180.

Remote collaborative environment (RCE) controller 222 handles the transfer of messages and data to and from customer transfer controller 212 and vendor transfer controller 232. RCE controller 222 also creates a record for all work flows received from customers in database storage device 183. Thereafter, RCE controller 222 processes all data transfers and messages between customers and vendors associated with each work flow record in database storage device 183. Transaction tracking and accounting controller 224 is responsible for tracking work progress in each work flow, providing customers with invoices for work performed by vendors, transferring payments from customers to vendors, and maintaining a detailed accounting for each work flow. In effect, customers receive periodic (e.g. monthly) billing statements and "roll-up" types of accountings of transactions and applicable fees/rates related to the transactions. Vendors receive periodic (e.g., monthly) payments and a detailed accounting specifying which customers purchased which services and at what fee(s)/rate(s).

Figure 3:
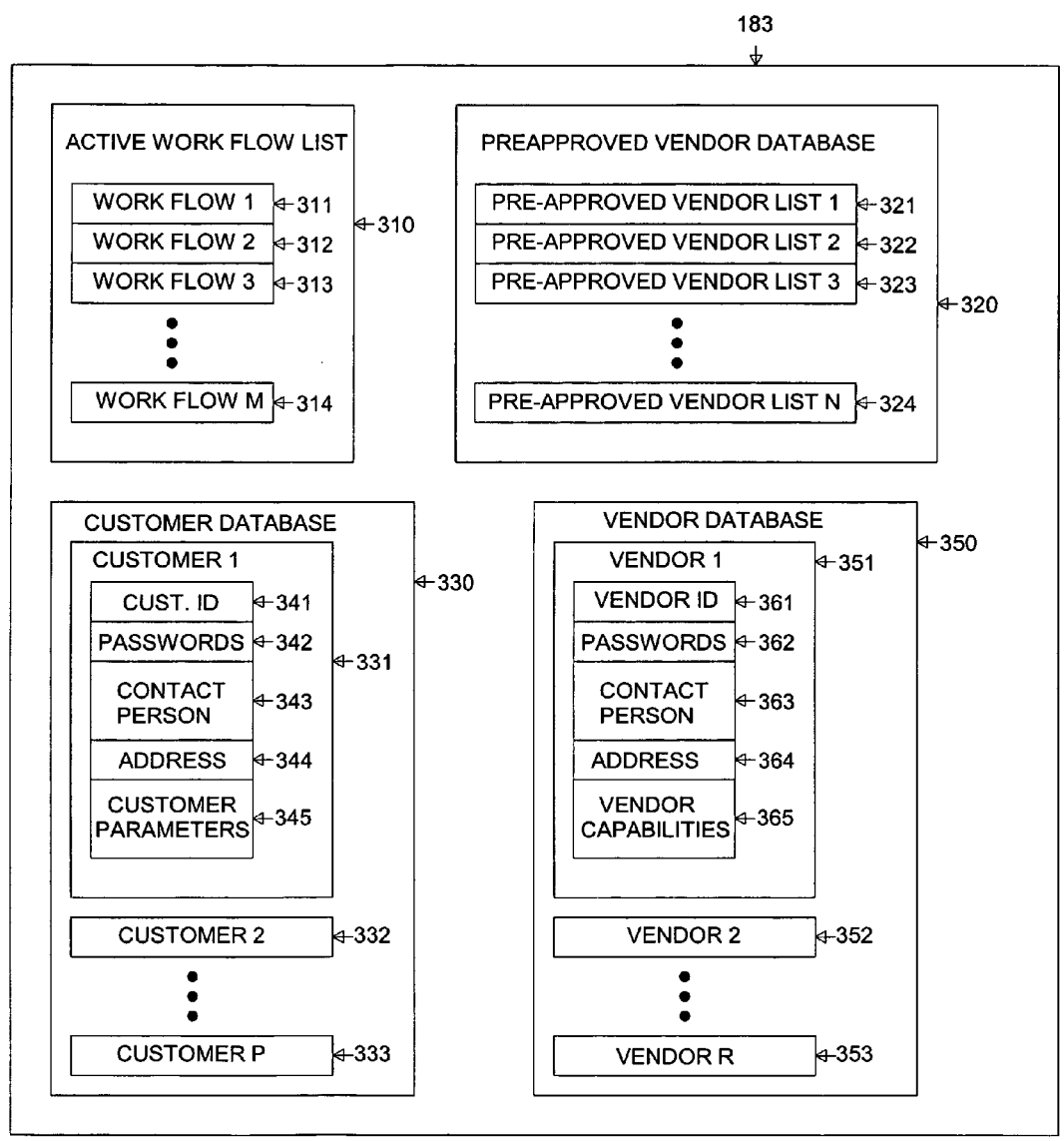
FIG. 3 is a more detailed block diagram of selected portions of an exemplary database storage device according to one embodiment of the present invention.

FIG. 3 is a more detailed block diagram of selected portions of database storage device 183 according to one embodiment of the present invention. Database storage device 183 stores a plurality of records, including active work flow list 310, pre-approved vendor database 320, customer database 330, and vendor database 350. In some embodiments of the present invention, the information in customer database 330 and vendor database 350 may be created by the customer or vendor "pushing" information to RCE network 180 through records. However, in alternate embodiments of the present invention, the information in customer database 330 and vendor database 350 may be created when RCE network 180 gathers the vendor and customer information (periodically or as needed), including work flows, from remotely accessible servers set up by customers and vendors.

Active work flow list 310 comprises "M" work flow records, including exemplary work flow records 311–314 (arbitrarily labeled Work Flow 1, Work Flow 2, Work Flow 3, and Work Flow M, respectively), one for each of the M work flows that are currently ongoing in the remote collaborative environment provided by RCE network 180. RCE controller 222 creates a new work flow record each time a customer requests that a service be performed. Thereafter, RCE controller 222 updates each work flow record as messages, documents, and data are transmitted between customers and vendors associated with each work record.

Pre-approved vendor database 320 comprises "N" pre-approved vendor lists, including exemplary pre-approved vendor lists 321–324 (arbitrarily labeled Pre-approved Vendor List 1, Pre-approved Vendor List 2, Pre-approved Vendor List 3, and Pre-approved Vendor List N, respectively). Each of pre-approved vendor lists 321–324 comprises a list of vendors having an acceptable level of expertise in particular field. For example, pre-approved vendor list 321 may comprise a list of accredited accountants. Also, pre-approved vendor list 322 may comprise a list of petroleum refining engineers having a particular level of experience (determined by degrees, years of experience, or other relevant criteria). Pre-approved vendor list 323 may comprise a list of orthopedists.

Customer database 330 comprises a list of individual customers associated with active or inactive (i.e., past) work flows. In essence, customer database 330 is a comprehensive list of subscribers to the services provided by vendors through the remote collaborative environment created by RCE network 180. Customer database 330 comprises "P" customer records, including exemplary customer records 331–333 (arbitrarily labeled Customer 1, Customer 2 and Customer P, respectively).

Exemplary customer record 331 comprises a unique Customer Identification (ID) field 341 that stores one or more user names associated with a individual person or with one or more persons at a business entity associated with customer record 331. Exemplary customer record 331 also comprises Passwords field 342, which stores at least one password associated with each user name in Customer ID field 341. RCE controller 222 uses the user names and passwords in Customer ID field 341 and Passwords field 342 to authenticate each customer that accesses RCE network 180. Exemplary customer record 331 further comprises Contact Person field 343 and Address field 344. Contact person field 343 stores the name, telephone number, and e-mail address of a designated contact person associated with customer record 331. Address field 344 stores the business address of the person or business entity associated with customer record 331.

Exemplary customer record 331 also comprises customer parameters field 345. Customer parameters field 345 stores information regarding the capabilities and/or limitations of customer network 110 and the equipment owned and controlled by the customer, among other things. For example, customer parameters field 345 may contain information regarding the information technology (IT) supported by customer network 110, such as customer operating system (e.g., Windows™ NT, Novell™, etc.), customer database (e.g., SAP, Oracle, etc.), and the like. Additionally, customer parameters field 345 may contain information about, for example, the heat exchanger or power generator equipment used by the customer, or the medical diagnostic equipment used by the customer. In an advantageous embodiment of the present invention, RCE network 180 may allow potential vendors to access information in customer parameters field 345 in order to answer vendor questions or otherwise provide required/requested information.

Vendor database 350 comprises a list of individual vendors associated with active or inactive (i.e., past) work flows. Vendor database 350 is a comprehensive list of service providers that provide the services brokered to customers through the remote collaborative environment created by RCE network 180. Vendor database 350 comprises "R" vendor records, including exemplary vendor records 351–353 (arbitrarily labeled Vendor 1, Vendor 2 and Customer R, respectively).

Exemplary vendor record 351 comprises a unique Vendor Identification (ID) field 361 that stores one or more user names associated with a individual person or with one or more persons at a business entity associated with vendor record 351. Exemplary vendor record 351 also comprises Passwords field 362, which stores at least one password associated with each user name in Vendor ID field 361. RCE controller 222 uses the user names and passwords in Vendor ID field 361 and Passwords field 362 to authenticate each vendor that accesses RCE network 180. Exemplary vendor record 351 further comprises Contact Person field 363 and Address field 364. Contact person field 363 stores the name, telephone number, and e-mail address of a designated contact person associated with vendor record 351. Address field 364 stores the business address of the person or business entity associated with vendor record 351.

Exemplary vendor record 351 also comprises vendor capabilities field 365. Vendor capabilities field 365 stores information regarding the capabilities of the vendor that operates vendor network 150, among other things. For example, if the vendor is an accounting firm, vendor capabilities field 365 may comprise information concerning the fields of expertise of each accountant that uses vendor network 150. If the vendor is a medical association, vendor capabilities field 365 may comprise information concerning the medial specialties of each doctor that uses vendor network 150. In an advantageous embodiment of the present invention, RCE network 180 may use the contents of vendor capabilities field 365 to create one or more of exemplary pre-approved vendor lists 321–324.

Figure 4:
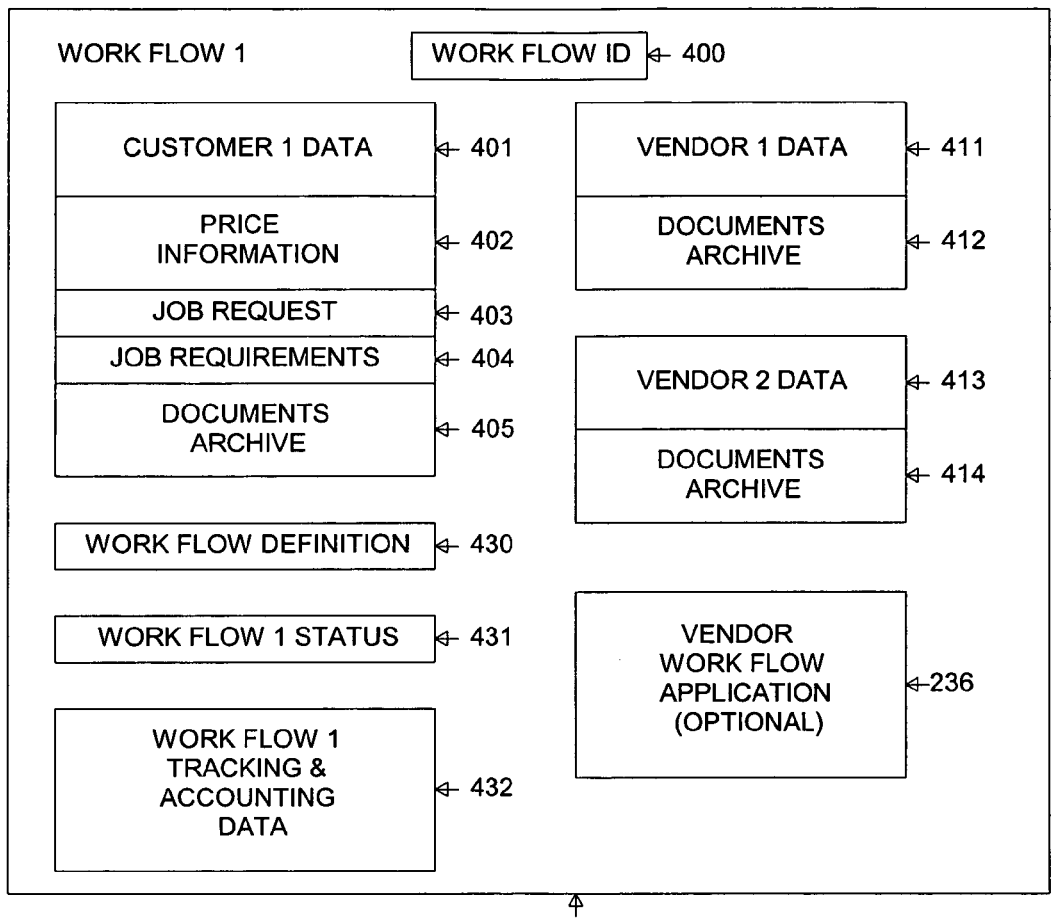
FIG. 4 is a more detailed block diagram of selected portions of an exemplary work flow record according to one embodiment of the present invention.

FIG. 4 is a more detailed block diagram of selected portions of exemplary work flow record 311 according to one embodiment of the present invention. Work flow record 311 (Work Flow 1) comprises work flow identification (ID) field 400, which stores a unique identifier (e.g., "Work Flow 1") created by RCE controller 222 when the work flow record 311 is first created. In exemplary work flow record 311, Customer 1 has requested a service and Vendor 1 is providing the service. Work flow record 311 stores in Customer 1 Data field 401 relevant identification data associated with Customer 1, including, for example, the unique identifier in Customer ID field 341.

Work flow record 311 also stores information unique to Work Flow 1, such as storing customer price information, if any, in Price Information field 402, storing a description of the requested service(s) in Job Request field 403, storing particular job requirements, such as deadlines and electronic document and data formats, in Job Requirements field 404. Work flow record 311 also comprises customer documents archive 405 for storing documents and data files provided by Customer 1 as part of the service request.

Work flow record 311 stores in Vendor 1 Data field 411 relevant identification data associated with Vendor 1, including, for example, the unique identifier in Vendor ID field 361. Work flow record 311 also comprises vendor documents archive 412 for storing documents and data files provided by Vendor 1 as part of the service request.

If more that one vendor is providing services associated with Work Flow 1, as where an engineering consultant provides engineering services and an accountant provides accounting services, work flow record 311 also stores in Vendor 2 Data field 413 relevant identification data associated with Vendor 2, including, for example, the unique identifier in the Vendor ID field associated with vendor record 352. Work flow record 311 also comprises vendor documents archive 414 for storing documents and data files provided by Vendor 2 as part of the service request.

Work flow definitions field 430 comprises the work flow definitions previously established by the customer in customer work flow definitions file 217 and by the vendor in vendor work flow definitions file 237 and may also contain additional work flow definitions created by RCE controller 222. Work Flow 1 status field 431 indicates whether Work Flow 1 is still on-going or is complete. Work Flow 1 Tracking and Accounting Data field 432 stores a complete history of all transactions occurring between Customer 1, Vendor 1 and Vendor 2. This includes all document transfers, message transfers, data file transfers, and an accounting of all time and billing payment information.

Transaction tracking and accounting controller 224 uses the information in work flow definitions field 430, Work Flow 1 status field 431, and Work Flow 1 Tracking and Accounting Data field 432 to provide a detailed accounting to Customer 1 and, optionally, Vendor 1, or Vendor 2, or both. The detailed accounting may include invoices for the costs associated with a primary service requested by Customer 1 and other invoices regarding the costs associated with related secondary services requested by Vendor 1 or Vendor 2 in order to perform the primary requested service.

Finally, work flow record 311 optionally may store one or more vendor work flow applications 236 associated with vendor network 150. It was previously explained that a vendor may, for a price, allow customized vendor work flow application 236 to be exported to RCE network 180, to customer network 110, or to both. In the illustrated embodiment, Vendor 1 has developed a unique and customized vendor work flow application 236 that has been exported to RCE network 180 and stored in database storage device 183 as part of work flow record 311.

In a typical scenario, Vendor 1 develops a customized software application that is particular to the need of one customer. For example, a power plant expert may periodically perform a heat exchanger analysis for a manufacturing firm customer. Since much of this analysis may be repetitive (i.e., the heat exchanger model and its operating parameters likely don't change between each analysis), the power plant expert may develop customized vendor work flow application 236 in order to perform the repetitive analysis on heat exchanger statistics that are received as a data file. Thus, the expertise of the power plant expert may be encapsulated in customized vendor work flow application 236. However, it is not required that customized vendor work flow application 236 remain resident in vendor network 150. Therefore, in order to make the remote collaborative environment operate more efficiently, customized vendor work flow application 236 may be exported to a location from which it may be more easily accessed or more rapidly executed, such as RCE network 180 or customer network 110, or both.

As noted above, a work flow may involve multiple steps, some of which may be taken conditionally depending on results of prior steps. Multiple customers and vendors may be involved in a work flow and tasks may be inserted during the execution of a work flow as a need for an additional intermediate step is realized. The steps in a work flow may be in a partial temporal order, permitting some to be executed in parallel by the same or different vendors.

There are several mechanisms now available through which the content of work flows can be represented in RCE network 180. For example, a work flow may be defined in a new industry-specific or business-specific XML-based markup language. In this case, tags could be defined for different types of tasks, their prerequisites and post-conditions, level of effort expectations, parametric variants, and the like. Some other symbolic representation capable of being manipulated by an algorithm may be defined. As a result of recent improvements in natural language processing software, free-text natural language may also be used.

The representation mechanism captures the tasks or steps involved in completing the customer service request, and also the accounting information necessary for ensuring that charges, debits, and credits are appropriately according to, for example, a previously established policy, the nature of the workflow, or other factors.

It is important to note that a vendor may be a vendor with respect to one service request, but may be a customer with respect to a related service request. In a previous example, a vendor employee, a power plant expert, prepares a draft report analyzing the performance of a customer's generator and the draft report is then edited by an editor within vendor network 150. The power plant expert is a vendor with respect to the customer service request for a power generator analysis and a customer with respect to the editing services. If a vendor, in fulfilling a service request, initiates one or more related secondary customer/vendor service request cycles in order to complete the primary service request, transaction tracking and accounting controller 224 is capable of providing a unified accounting of all service requests associated with the primary service request. Additionally, the vendors of the related service requests may complete their services in ignorance of the larger work flow.

Figure 5:
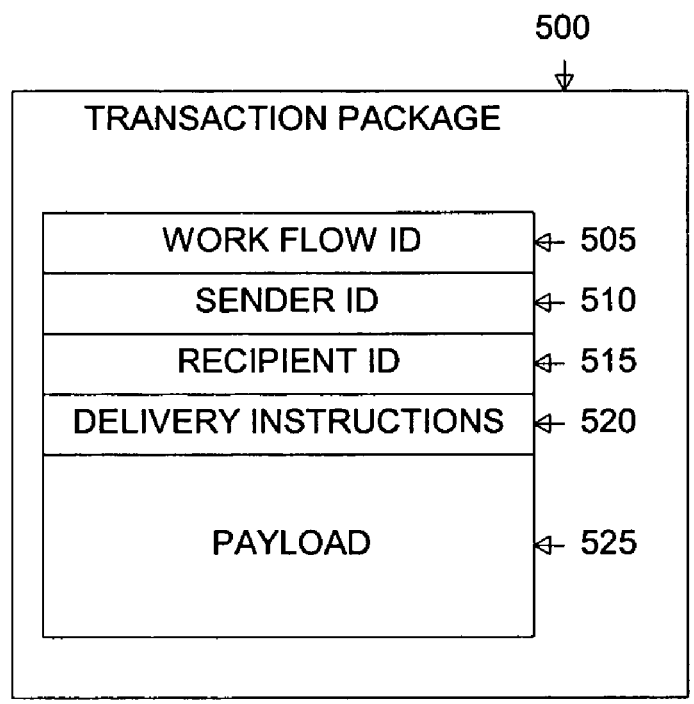
FIG. 5 is a block diagram of an exemplary transaction package associated with a work flow in the remote collaborative environment network according to one embodiment of the present invention.

FIG. 5 is a block diagram of an exemplary transaction package 500 associated with a work flow in RCE network 180 according to one embodiment of the present invention. Transaction package 500 illustrates the minimum data that is transferred between RCE network 180 and either of customer network 110 and vendor network 150. Transaction package 500 comprises work flow ID field 505, which identifies a unique work flow in database storage device 183, and sender ID 510, which contains the unique identifier of the customer or vendor sending transaction package 500, recipient ID 515, which contains the unique identifier of the customer or vendor receiving transaction package 500. Transaction package 500 also comprises optional delivery instructions 520 and payload 525.

Each of RCE controller 222, customer transfer controller 212 and vendor transfer controller 232 generates or examines, or both, the values in work flow ID 505, sender ID 510 and recipient ID 515 in order to direct messages, documents and data between RCE network 180, customer network 110, and vendor network 150. The actual message, document or data file is stored in payload field 525.

Figure 6:
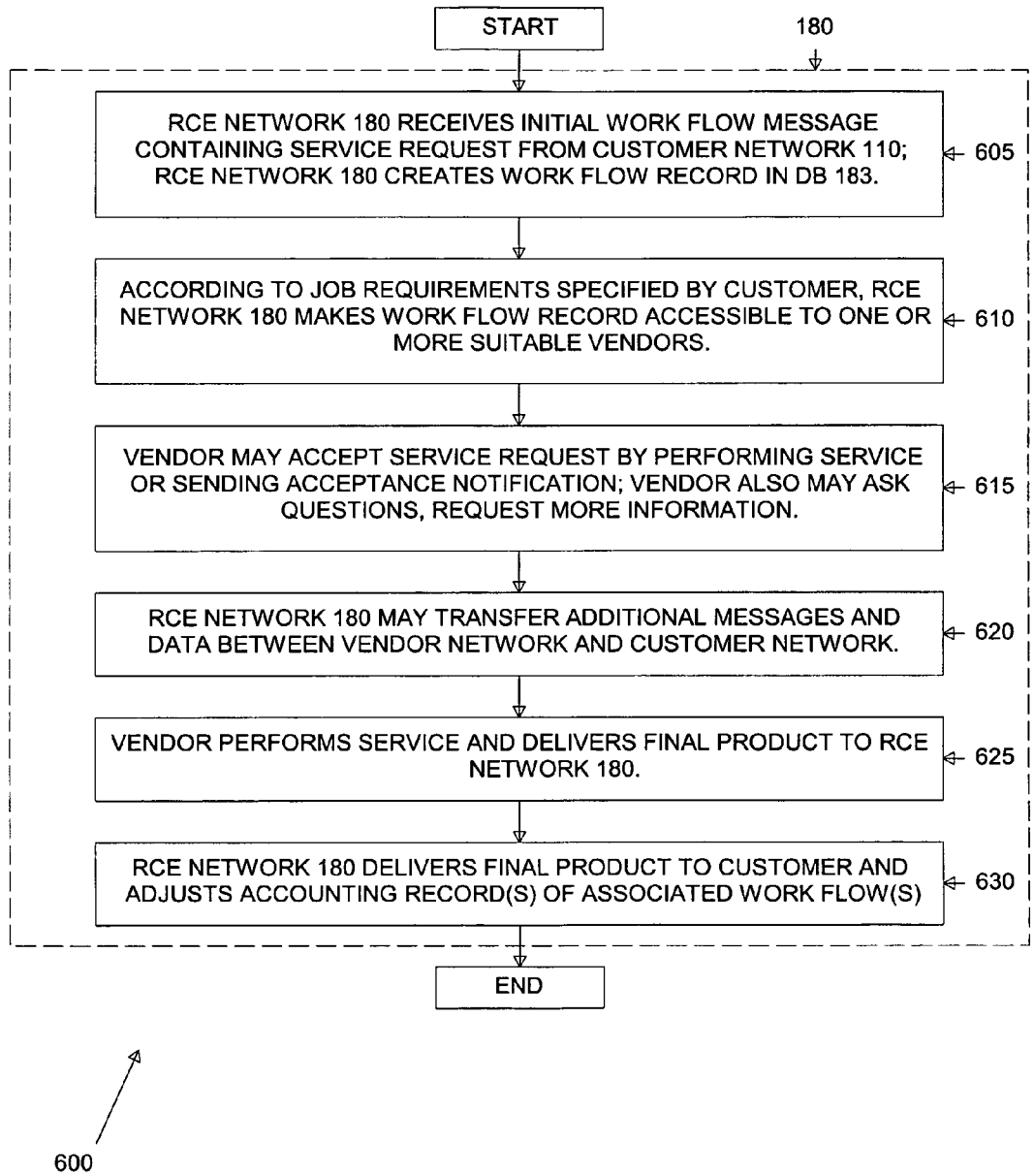
FIG. 6 is a flow diagram illustrating the operation of a remote collaborative environment server according to one embodiment of the present invention.

FIG. 6 depicts flow diagram 600, which illustrates the operation of RCE network 180 according to one embodiment of the present invention. In the example described, a work flow is initiated by a user of customer network 110 and is performed by a service provider (human or software application) associated with vendor network 150. During normal operation, RCE network 180 receives from customer network 110 an initial work flow message containing a service request. RCE network 180 then creates a corresponding work flow record in database storage device 183 (process step 605). Alternatively, RCE network 180 may actively poll customer network 110 at periodic intervals, rather than having the customer network 110 "push" work flow information to RCE network 180.

According to the job requirements specified by the operator of customer network 110, RCE network 180 may make the work flow record available to one or more vendors (process step 610). RCE network 180 may use the nature of the job request specified by operator of customer network 110 to determine a list of suitable vendors. This information may be determined by RCE network 180 by, for example, requiring the operator of customer network 110 to select (via browser 210 and web site 220) a particular service from a list of available services (i.e., accounting, heat exchanger analysis, medical diagnosis, and the like). The work flow record may be made available to pre-approved vendors by allowing such qualified vendors to access and review appropriate work flow records in database storage device 183. Alternatively, the work flow record may be made available to one or more pre-approved vendors by transmitting a notification message (including a copy of the work flow record) to the vendors informing them of the existence and location of the work flow record.

The operator of vendor network 150 may accept the service request by performing the requested service or sending an acceptance notification to the operator of customer network 110. If the operator of vendor network 150 accepts the service request, RCE network 180 may prevent other vendors from accessing the work flow record, or may annotate the work flow record so as to inform other vendors that the service request has already been accepted by the operator of vendor network 150. The operator of vendor network 150 may also transmit (via RCE network 180) questions and requests for information to customer network 110 (process step 615). Thereafter, RCE network 180 may transmit additional messages, electronic documents, and data between customer network 110 and vendor network 150 until vendor network 150 has sufficient information to perform the requested service (process step 620).

Eventually, the operator of vendor network 150 completes the requested service and delivers a final product to RCE network 180. The final product may comprise a text document, a spread sheet, compiled data, annotated data, and the like (process step 625). Finally, RCE network 180 delivers the final product to customer network 110 and transaction tracking and accounting controller 224 adjusts the accounting records associated with the primary work flow and any secondary work flows related to the primary work flow (process step 630).

In an advantageous embodiment of the present invention, work flows may be "retroactively" performed by a vendor. For example, a customer may request a service that no vendor currently associated with RCE network 180 can perform. However, new vendors may continually be added to database storage device 183 in RCE network 180. At some point, a new vendor capable of performing the unfulfilled service may join RCE network 180. To provide for this eventuality, all outstanding service requests are maintained in database storage device 183. RCE network 180 continually compares the capabilities of new vendors to all outstanding unfulfilled customer service requests to find matches. If a match occurs, RCE network 180 then allows the new vendor to access the work flow record for the unfulfilled service request.

Although the present invention and its advantages have been described in detail, those skilled in the art should understand that they can make various changes, substitutions and alterations herein without departing from the spirit and scope of the invention in its broadest form.

What is claimed is:

1. For use in connection with a network that provides communications between a plurality of customers generating service requests and a plurality of vendors that fulfill said service requests, a system for monitoring and controlling work flows associated with said service requests between said plurality of customers and said plurality of vendors comprising:

a main controller that:

creates a first work flow record used to control a first work flow associated with a first service request;

stores said first work flow record in a storage device associated with said main controller;

receives from a first customer within said plurality of customers and a first vendor within said plurality of vendors at least one of messages, data files, software applications, and documents, said first customer and said first vendor associated with said first work flow;

stores said at least one of messages, data files, software applications, and documents in said storage device in association with said work flow record; and transfers one or more of said at least one of messages, data files, software applications, and documents to at least one of said first customer and said first vendor, wherein said first work flow is at least partially developed or executed by said receiving, storing and transferring said at least one of messages, data files, software applications, and documents; and an accounting controller associated with said main controller that identifies at least one fee associated with said first work flow and that stores fee data associated with said at least one fee in said first work flow record;

wherein said first work flow record comprises a primary work flow record associated with said first service request and a secondary work flow record associated with a second service request, the second service request associated with said first work flow.

2. The system as set forth in claim 1 wherein said first work flow record comprises a plurality of work flow definitions defining at least one process step to be performed by at least one of said main controller, said accounting controller, a first customer processing device associated with said first customer, and a first vendor processing device associated with said first vendor.

3. The system as set forth in claim 2 wherein at least one of said plurality of work flow definitions is modifiable by said first customer.

4. The system as set forth in claim 2 wherein at least one of said plurality of work flow definitions is modifiable by said first vendor.

5. The system as set forth in claim 1 wherein said second service request is generated by said first vendor in response to said first service request generated by said first customer.

6. The system as set forth in claim 1 wherein said accounting controller further identifies at least one additional fee associated with a second work flow and stores second fee data associated with said at least one additional fee in said first work flow record, the second work flow associated with the second service request.

7. The system as set forth in claim 6 wherein said accounting controller stores fee data associated with said first work flow in said primary work flow record and stores fee data associated with said second work flow in said secondary work flow record.

8. The system as set forth in claim 1 wherein a first service associated with said first service request is performed by a customized computer-executable application generated by said first vendor, wherein said customized computer-executable application performs specific operations designed by said first vendor to meet unique requirements of said first customer.

9. For use in connection with a network that provides communications between a plurality of customers generating service requests and a plurality of vendors that fulfill said service requests, a system for monitoring and controlling work flows associated with said service requests between said plurality of customers and said plurality of vendors comprising:
   a main controller that:
      creates a first work flow record used to control a first work flow associated with a first service request;
      stores said first work flow record in a storage device associated with said main controller;
      receives from a first customer and a first vendor associated with said first work flow at least one of messages, data files, software applications, and documents;
      stores said at least one of messages, data files, software applications, and documents in said storage device; and
      transfers one or more of said at least one of messages, data files, software applications, and documents to at least one of said first customer and said first vendor; and
   an accounting controller associated with said main controller that identifies at least one fee associated with said first work flow and that stores fee data associated with said at least one fee in said first work flow record;
   wherein a first service associated with said first service request is performed by a customized computer-executable application generated by said first vendor, wherein said customized computer-executable application performs specific operations designed by said first vendor to meet unique requirements of said first customer;
   wherein said main controller transfers said customized computer-executable application from a first data processing device associated with said first vendor to at least one of a second data processing device associated with said main controller and a third data processing device associated with said customer, wherein said main controller transfers said customized computer-executable application to said at least one of said second data processing device and said third data processing device to cause said customized computer-executable application to execute more efficiently; and
   wherein said first work flow record comprises a primary work flow record associated with said first service request and a secondary work flow record associated with a second service request, the second service request associated with said first work flow.

10. A network comprising:
   a plurality of customer data processing devices that generate service requests created by a plurality of customers;
   a plurality of vendor data processing devices associated with a plurality of vendors that fulfill said service requests; and
   a system for monitoring and controlling work flows associated with said service requests between said plurality of customers and said plurality of vendors comprising:
      a main controller that;
         creates a first work flow record used to control a first work flow associated with a first service request;
         stores said first work flow record in a storage device associated with said main controller;
         receives from a first customer within said plurality of customers and a first vendor within said plurality of vendors at least one of messages, data files, software applications, and documents, said first customer and said first vendor associated with said first work flow;
         stores said at least one of messages, data files, software applications, and documents in said storage device in association with said work record; and
         transfers one or more of said at least one of messages, data files, software applications, and documents to at least one of said first customer and said first vendor, wherein said first work flow is at least partially developed or executed by said receiving, storing and transferring said at least one of messages, data files, software applications, and documents; and
      an accounting controller associated with said main controller that identifies at least one fee associated with said first work flow and stores fee data associated with said at least one fee in said first work flow record;
   wherein said first work flow record comprises a primary work flow record associated with said first service request and a secondary work flow record associated with a second service request, the second service request associated with said first work flow.

11. The network as set forth in claim 10 wherein said first work flow record comprises a plurality of work flow definitions defining at least one process step to be performed by at least one of said main controller, said accounting controller, a first customer processing device associated with said first customer, and a first vendor processing device associated with said first vendor.

12. The network as set forth in claim 11 wherein at least one of said plurality of work flow definitions is modifiable by said first customer.

13. The network as set forth in claim 12 wherein at least one of said plurality of work flow definitions is modifiable by said first vendor.

14. The network as set forth in claim 10 wherein said second service request is generated by said first vendor in response to said first service request generated by said first customer.

15. The network as set forth in claim 10 wherein said accounting controller identifies at least one additional fee associated with a second work flow and stores second fee data associated with said at least one additional fee in said first work flow record, the second work flow associated with the second service request.

16. The network as set forth in claim 15 wherein said accounting controller stores fee data associated with said first work flow in said primary work flow record and stores fee data associated with said second work flow in said secondary work flow record.

17. The network as set forth in claim 10 wherein a first service associated with said first service request is performed by a customized computer-executable application generated by said first vendor, wherein said customized computer-executable application performs specific operations designed by said first vendor to meet unique requirements of said first customer.

18. A network comprising:
   a plurality of customer data processing devices that generate service requests created by a plurality of customers;
   a plurality of vendor data processing devices associated with a plurality of vendors that fulfill said service requests; and
   a system for monitoring and controlling work flows associated with said service requests between said plurality of customers and said plurality of vendors comprising:
      a main controller that:
         creates a first work flow record used to control a first work flow associated with a first service request;
         stores said first work flow record in a storage device associated with said main controller;
         receives from a first customer and a first vendor associated with said first work flow at least one of messages, data files, software applications, and documents;
         stores said at least one of messages, data files, software applications, and documents in said storage device; and
         transfers one or more of said at least one of messages, data files, software applications, and documents to at least one of said first customer and said first vendor; and
      an accounting controller associated with said main controller that identifies at least one fee associated with said first work flow and stores fee data associated with said at least one fee in said first work flow record;
   wherein a first service associated with said first service request is performed by a customized computer-executable application generated by said first vendor, wherein said customized computer-executable application performs specific operations designed by said first vendor to meet unique requirements of said first customer;
   wherein said main controller transfers said customized computer-executable application from a first data processing device associated with said first vendor to at least one of a second data processing device associated with said main controller and a third data processing device associated with said customer, wherein said main controller transfers said customized computer-executable application to said at least one of said second data processing device and said third data processing device to cause said customized computer-executable application to execute more efficiently;
   wherein said first work flow record comprises a primary work flow record associated with said first service request and a secondary work flow record associated with a second service request, the second service request associated with said first work flow.

19. For use in a network that provides communications between a plurality of customers generating service requests and a plurality of vendors that fulfill the service requests, a method of monitoring and controlling work flows associated with the service requests between the plurality of customers and the plurality of vendors comprising the steps of:
   creating a first work flow record used to control a first work flow associated with a first service request;
   storing the first work flow record in a storage device;
   receiving from a first customer within said plurality of customers and a first vendor within said plurality of vendors at least one of messages, data files, software applications, and documents, said first customer and said first vendor associated with said first work flow;
   storing the at least one of messages, data files, software applications, and documents in the storage device in association with said work record;
   transferring one or more of the at least one of messages, data files, software applications, and documents to at least one of the first customer and the first vendor, wherein said first work flow is at least partially developed or executed by said receiving, storing and transferring said at least one of messages, data files, software applications, and documents; and
   identifying at least one fee associated with the first work flow and storing fee data associated with the at least one fee in the first work flow record;
   wherein said first work flow record comprises a primary work flow record associated with said first service request and a secondary work flow record associated with a second service request, the second service request associated with said first work flow.

20. The method as set forth in claim 19 wherein the first work flow record comprises a plurality of work flow definitions defining at least one process step to be performed by at least one of a first network processing device associated with the network, a first customer processing device associated with the first customer, and a first vendor processing device associated with the first vendor.

21. The method as set forth in claim 20 wherein at least one of the plurality of work flow definitions is modifiable by the first customer.

22. The method as set forth in claim 20 wherein at least one of the plurality of work flow definitions is modifiable by the first vendor.

23. The method as set forth in claim 19 wherein the second service request is generated by the first vendor in response to the first service request generated by the first customer.

24. The method as set forth in claim 19 including the further steps of:
   identifying at least one additional fee associated with a second work flow, the second work flow associated with the second service request; and
   storing second fee data associated with the at least one additional fee in the first work flow record.

25. The method as set forth in claim 24 wherein fee data associated with the first work flow is stored in the primary work flow record and fee data associated with the second work flow is stored in the secondary work flow record.

26. The method as set forth in claim 19 wherein a first service associated with the first service request is performed by a customized computer-executable application generated by the first vendor, wherein the customized computer-executable application performs specific operations designed by the first vendor to meet unique requirements of the first customer.

27. For use in a network that provides communications between a plurality of customers generating service requests and a plurality of vendors that fulfill the service requests, a method of monitoring and controlling work flows associated with the service requests between the plurality of customers and the plurality of vendors comprising the steps of:

creating a first work flow record used to control a first work flow associated with a first service request;

storing the first work flow record in a storage device;

receiving from a first customer and a first vendor associated with the first work flow at least one of messages, data files, software applications, and documents;

storing the at least one of messages, data files, software applications, and documents in the storage device;

transferring one or more of the at least one of messages, data files, software applications, and documents to at least one of the first customer and the first vendor;

identifying at least one fee associated with the first work flow and storing fee data associated with the at least one fee in the first work flow record;

performing a first service associated with the first service request by a customized computer-executable application generated by the first vendor, wherein the customized computer-executable application performs specific operations designed by the first vendor to meet unique requirements of the first customer; and transferring the customized computer-executable application from a first data processing device associated with the first vendor to at least one of a second data processing device associated with the network and a third data processing device associated with the customer, wherein the customized computer-executable application is transferred to the at least one of the second data processing device and the third data processing device to cause the customized computer-executable application to execute more efficiently;

wherein said first work flow record comprises a primary work flow record associated with said first service request and a secondary work flow record associated with a second service request, the second service request associated with said first work flow.

* * * * *